Nov. 12, 1957 R. D. HARDESTY Re. 24,389

FOOD MIXER

Original Filed June 12, 1953

*INVENTOR.*
RICHARD D. HARDESTY
BY
Hauke & Hardesty
ATTORNEYS

United States Patent Office

Re. 24,389

Reissued Nov. 12, 1957

24,389

FOOD MIXER

Richard D. Hardesty, Wichita, Kans.

Original No. 2,697,946, dated December 28, 1954, Serial No. 361,228, June 12, 1953. Application for reissue January 30, 1956, Serial No. 562,373

4 Claims. (Cl. 74—22)

Matter enclosed in heavy brackets [ ] appears in the original patent but forms no part of this reissue specification; matter printed in italics indicates the additions made by reissue.

The present invention relates to motor actuated mixers or stirrers such as are commonly used in home kitchens for mixing drinks or the like.

Among the objects of the invention is to provide a mixer in which the agitator spindle is either rotatable or vertically reciprocable at the will of the operator.

Another object is to provide a simple economically produced mechanism for producing the alternative motion of the agitator, quickly and without the necessity of changing parts.

Still other objects will readily occur to those skilled in the art upon reference to the following description and the accompanying drawings in which.

Figure 1:
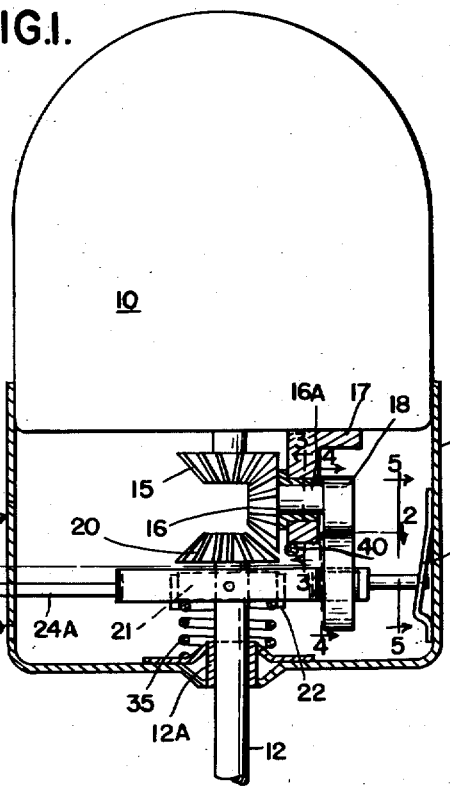
Fig. 1 is a vertical central sectional view showing parts in elevation.
Figure 5:
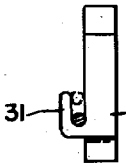
Fig. 5 is a section on line 5—5 of Fig. 1.
Figure 6:
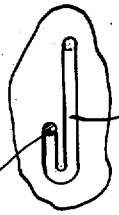
Fig. 6 is a section on line 6—6 of Fig. 1.
Figure 4:
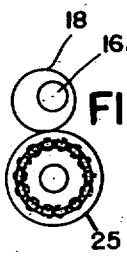
Fig. 4 is a section on line 4—4 of Fig. 1.
Figure 2:
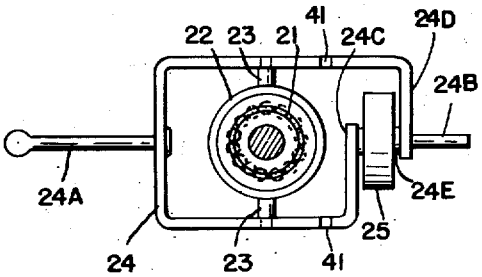
Fig. 2 is a view of the frame member carrying the spindle and on line 2—2 of Fig. 1.
Figure 3:
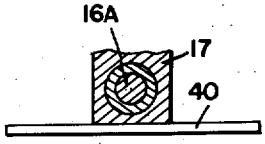
Fig. 3 is a section on line 3—3 of Fig. 1.

In the drawings, an electric motor is indicated conventionally at 10 and since the customary use of the device will be in the position shown, the arrangement of the motor will be mentioned hereinafter as having its shaft vertical.

To the bottom of the motor casing is affixed a cup like casing 11, serving to support and protect the mechanism and through the bottom of the casing projects the spindle 12 of suitable length and carrying at its lower end suitable blades or other mixing means (not shown).

On the lower end of the motor shaft is fixed a small bevel gear 15 meshing with a second bevel gear 16 fixed to a short horizontal shaft 16A mounted in a suitable bearing in a bracket 17 fixed to the motor 10. At the other end of shaft 16A is fixed an eccentric 18.

Mounted in the bottom wall of casing 11 in suitable bearing 12A and in alignment with the motor shaft, is the mixer spindle 12, carrying at its upper end a third bevel gear 20 adapted to mesh with gear 16. The spindle 12 is supported within the casing in a ball bearing 21 held in a ring 22 provided with trunnion 23 by means of which the ring is pivoted in a frame 24.

The frame 24 is generally rectangular and has at one end a handle 24A and at the other a pin 24B, which conveniently serves as a mounting for a roller 25.

As shown, the frame 24 is made of a single piece having its ends overlapping and spaced at one end of the rectangle, as at 24C and 24D, and the roller 25 carried on the enlarged inner end 24E of the pin 24B. Roller 25 is preferably a small ball bearing.

The frame and its attached parts is so arranged in the casing that the handle projects through a side wall through a U-shaped slot 30, while the pin 24B extends into a slot 31 formed in or on a vertically arranged strip 32 fixed to the inner face of the casing diametrically opposite slot 30.

The frame 24 and its attached parts are so arranged in the casting that the roller 25 is under and in position to contact the eccentric 18 and is biased upwardly by a relatively strong spring 35 arranged between the bottom of the casing and the outer race of ball bearing 21.

When the parts are in the position shown in Fig. 1, the handle 24A is in the shorter branch of the U-shaped slot 30 and the gear 20 is out of mesh with gear 16, consequently rotation of the motor shaft will rotate the eccentric 18 and will produce a longitudinal reciprocation of the spindle 12.

On the other hand, when the handle 24A is in the longer branch of the slot 30, the gear 20 will mesh with gear 16 and be rotated and this, of course, rotates spindle 12.

In the reciprocation of the spindle 12, the frame 24 swings in its up and down motion about the outer end portion of the handle 24A as pivot—i. e., the wall edge at slot 30 acts as the pivot. At the same time the end of pin 24B moves up and down in its slot 31.

In the rotation of spindle 12, the contact between gears 20 and 16 may be used as the pivot or fulcrum to swing the roller 25 away from eccentric 18, but in order to absorb some of the pressure between the two gears due to the upward thrust of spring 35, it is preferred to provide a cross rod 40, fixed to bracket 17, of sufficient length to span frame 24 and contact the latter as it is lifted. Suitable notches 41 are provided in the frame for this purpose.

I claim:

1. In a mixing device having a mixing spindle and driving motor therefor, means operatively connecting said motor and spindle and comprising a gear fixed to the shaft of said motor, a second gear meshing therewith, and a gear fixed to said spindle, means for moving the last mentioned gear into and out of mesh with the second gear and means operable during the out of mesh relation to impart a longitudinal reciprocatory movement to said spindle.

2. In a mixing device, a motor having a drive gear fixed to the shaft thereof, a second shaft having at one end a gear meshing with said drive gear and at its other end an eccentric, a movable frame having mounted therein a rotatable spindle having fixed to it a gear, adapted to be meshed with the second mentioned gear, said frame also carrying a roller in position to contact said eccentric, and means for tilting said frame whereby to mesh the gears and separate the roller from the eccentric or to unmesh the gears and press the roller against the eccentric.

3. In a mixer, an electric motor arranged with its shaft in a vertical position and having fixed to its lower end a bevel gear, a horizontally arranged shaft having at one end a second bevel gear meshing with the first gear and having at its other end an eccentric, a horizontally arranged frame below said horizontal shaft, said frame having depending therefrom and rotatably mounted therein in alignment with the motor shaft, a mixing spindle, a bevel gear fixed to the upper end of said spindle and adapted to be meshed with the second gear, a roller carried by said frame and in position to contact said eccentric, means for tilting said frame to thereby cause meshing or unmeshing of the second gear and spindle gear and at the same time cause the separation or contacting of the eccentric and roller.

*4. In a mixing device having a mixing spindle and driving motor therefor, means operatively connecting said motor and spindle comprising a gear in operative driving relationship with said motor and fixed upon a shaft,*

*an eccentric also fixed to said shaft, a second gear fixed to said spindle, a pivoted frame carrying said spindle and affixed gear and having mounted thereon a roller positioned to contact said eccentric, and means for moving said frame on its pivots whereby to mesh said gears while breaking contact between the roller and eccentric or establishing such contact while unmeshing the gears.*

References Cited in the file of this patent or the original patent

UNITED STATES PATENTS

| | | |
|---|---|---|
| 1,356,556 | Payne | Oct. 26, 1920 |
| 2,318,848 | Gibson | May 11, 1943 |
| 2,417,170 | Langfelder | Mar. 11, 1947 |